United States Patent
Goodwin

(10) Patent No.: US 9,699,158 B2
(45) Date of Patent: Jul. 4, 2017

(54) NETWORK USER IDENTIFICATION AND AUTHENTICATION

(71) Applicant: Russell S. Goodwin, Singapore (SG)

(72) Inventor: Russell S. Goodwin, Singapore (SG)

(*) Notice: Subject to any disclaimer, the term of this patent is extended or adjusted under 35 U.S.C. 154(b) by 0 days.

(21) Appl. No.: 14/127,944

(22) PCT Filed: Sep. 21, 2012

(86) PCT No.: PCT/SG2012/000350
§ 371 (c)(1),
(2) Date: Dec. 19, 2013

(87) PCT Pub. No.: WO2013/043129
PCT Pub. Date: Mar. 28, 2013

(65) Prior Publication Data
US 2014/0208394 A1  Jul. 24, 2014

Related U.S. Application Data

(60) Provisional application No. 61/537,898, filed on Sep. 22, 2011.

(51) Int. Cl.
*H04L 29/06* (2006.01)

(52) U.S. Cl.
CPC ............ *H04L 63/08* (2013.01); *H04L 63/102* (2013.01); *H04L 63/0853* (2013.01); *H04L 63/126* (2013.01); *H04L 63/164* (2013.01)

(58) Field of Classification Search
CPC ..... H04L 63/164; H04L 63/102; H04L 63/08; H04L 63/0853; H04L 63/126
See application file for complete search history.

(56) References Cited

U.S. PATENT DOCUMENTS

| | | | |
|---|---|---|---|
| 6,986,061 B1 | 1/2006 | Kunzinger | |
| 7,536,464 B1 | 5/2009 | Dommety et al. | |
| 7,774,828 B2 | 8/2010 | Benenati et al. | |
| 9,439,075 B2 | 9/2016 | Yegani et al. | |
| 2002/0042875 A1* | 4/2002 | Shukla | H04L 29/12009 713/151 |
| 2002/0162003 A1* | 10/2002 | Ahmed | 713/176 |
| 2004/0002356 A1 | 1/2004 | Honda | |

(Continued)

FOREIGN PATENT DOCUMENTS

| | | |
|---|---|---|
| CN | 1534921 B | 10/2004 |
| CN | 101401463 A | 4/2009 |

OTHER PUBLICATIONS

Patel et al., Request for Comments: 4283, Mobile Node Identifier Option for Mobile IPv6 (MIPv6), Nov. 2005.*

(Continued)

*Primary Examiner* — William Goodchild
(74) *Attorney, Agent, or Firm* — Maschoff Brennan

(57) ABSTRACT

A method of identifying and authenticating a network user includes receiving a first network layer packet from a first user entity. The first network layer packet may include first unique identification information unique to the first user entity and independent of a first network address associated with the first network layer packet. The method further includes verifying, at a network layer of a network, that the first network layer packet is from the first user entity based on the first unique identification information.

28 Claims, 3 Drawing Sheets

(56) References Cited

U.S. PATENT DOCUMENTS

| | | | |
|---|---|---|---|
| 2004/0023656 A1* | 2/2004 | Purdy | H04L 29/06027 455/445 |
| 2004/0193712 A1* | 9/2004 | Benenati et al. | 709/225 |
| 2004/0205188 A1* | 10/2004 | Ahlard et al. | 709/224 |
| 2004/0246961 A1* | 12/2004 | Dai | H04L 12/12 370/392 |
| 2006/0062201 A1* | 3/2006 | Funk et al. | 370/352 |
| 2006/0195898 A1 | 8/2006 | Blicker | |
| 2007/0022469 A1 | 1/2007 | Cooper et al. | |
| 2007/0207818 A1* | 9/2007 | Rosenberg | G06Q 20/102 455/461 |
| 2012/0170470 A1* | 7/2012 | Duchenay | H04L 43/106 370/252 |
| 2012/0226742 A1* | 9/2012 | Momchilov | G06F 3/0481 709/203 |

OTHER PUBLICATIONS

Network Sorcery, ESP, Encapsulating Security Payload, http://www.networksorcery.com, retrieved on Mar. 19, 2015.

The TCP/IP Guide, IPSec Encapsulating Security Payload (ESP), http://www.tcpipguide.com, retrieved on Mar. 19, 2015.

Network Working Group, IP Encapsulating Security Payload (ESP), BBN Technologies, Dec. 2005, http://www.ietf.org, retrieved on Mar. 19, 2015.

Tipton, Harold et al. "Information Security Management Handbook, Fifth Edition", CRC Press LLC, 2004. pp. 383-400.

CN Office Action dated Jun. 2, 2016 as received in Application No. 201280046398.1 (brief translation).

"Globally Unique Identifier", https://en.wikipedia.org/wiki/Globally_unique_identifier, retrieved on Jul. 8, 2016, 7 pages.

Madjid Nakhjiri and Mahsa Nakjiri, "AAA and Network Security for Mobile Access", ISBN 9780470017456, https://books.google.com/books?id=Qb_hFQ6QBdsC&pg=PA105&lpg=PA105&dq=mipv4+registration+Request+packet+relationship+to+ipv4+packetheader&source=bl&ots=Gz8uMDo1ci&sig=ovZXQtl9XyaldcX3QvTxj4aaOJw&hl=en&sa=X&ved=0ahUKEwj0pbCDzonNAhVPVFIKHYEMAlwQ6AEIPDAD#v=onepage&q&f=false, retrieved on Jul. 11, 2016, p. 104.

Iti Saha Misra, "Wireless Communications and Networks: 3G and Beyond", ISBN 9383286806, https://books.google.com/books?id=XoHvAwAAQBAJ&pg=PA357&lpg=PA357&dq=MIPv4+Registration+Request+packet&source=bl&ots=supzvmWGAf&sig=pdoLeg6Fsqa6b7ZWsrciYhFljhc&hl=en&sa=X&ved=0ahUKEwiOk668gojNAhVYOVIKHV-dB0EQ6AEISDAF#v=onepage&q=MIPv4%20Registration%20Request%20packet&f=false, retrieved on Jul. 11, 2016, pp. 357-358.

"PC Encyclopedia: Definition of: payload", http://www.pcmag.com/encyclopedia/term/48909/payload, retrieved on Jul. 11, 2016, 1 page.

"Payload Definition", http://www.dir.ca.gov/dwc/eams/EAMSPresentTermSolutionDocumentRepository/Payload%20Definition.pdf, retrieved on Jul. 11, 2016, 1 page.

"Network Packet", https://en.wikipedia.org/wiki/Network_packet, retrieved on Jul. 11, 2016, 9 pages.

CN Office Action dated Dec. 30, 2016 as received in Application No. 201280046398.1 (English Translation).

* cited by examiner

NETWORK USER IDENTIFICATION AND AUTHENTICATION

PRIORITY

This patent application claims priority to U.S. Provisional Application No. 61/537,898, filed Sep. 22, 2011, which is incorporated herein by reference.

FIELD

Example embodiments described herein relate to the identifying and authenticating network users.

BACKGROUND

Managing identity is increasingly important in communication networks, including the Public Internet. As personalized content grows at a seemingly exponential rate, access to services and data are increasingly based on the identity of a user, rather than that of a machine. What is more, an ever increasing quantity of personal and sensitive data is stored and transmitted online. Securing this data and ensuring that only the right entities have access to the data is becoming ever more critical and the cost associated with this is rising at an extraordinary rate. What is more, the endless battle to stay one step ahead of those that would seek to abuse this system is not one that is being won.

Internet Protocol (IP), the basis for the modern Internet was not designed to facilitate the use of user identity for communications and this has led to a disjointed model developing over time that involves applying data security policies in two major ways. Either at the IP address level, using the source IP address of a given host, or based on a user identity that is application specific, identified in the application itself, and carried in the application layer of a network packet.

These two approaches often involve heavy compromise to the security model and this is most evident in the way that anonymous attackers can break into high profile internet services causing millions in damage with minimum risk of consequence. Users of these systems and applications, which now includes billions of users, are required to manage and remember any number of online account credentials in the form of usernames and passwords. To make matters worse, there are any number of ways that malicious individuals can, and do, steal this data so that they may impersonate a victim.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

According to some embodiments of the present disclosure, a method of identifying and authenticating a network user includes receiving a first network layer packet from a first user entity. The first network layer packet may include first unique identification information unique to the first user entity and independent of a first network address associated with the first network layer packet. The method further includes verifying, at a network layer of a network, that the first network layer packet is from the first user entity based on the first unique identification information.

Additional features and advantages of the present disclosure will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the present disclosure and are therefore not to be considered limiting of its scope. The disclosure will be described and explained with additional specificity and detail through the use of the accompanying drawings in which.

DETAILED DESCRIPTION OF SOME EXAMPLE EMBODIMENTS

Figure 1:
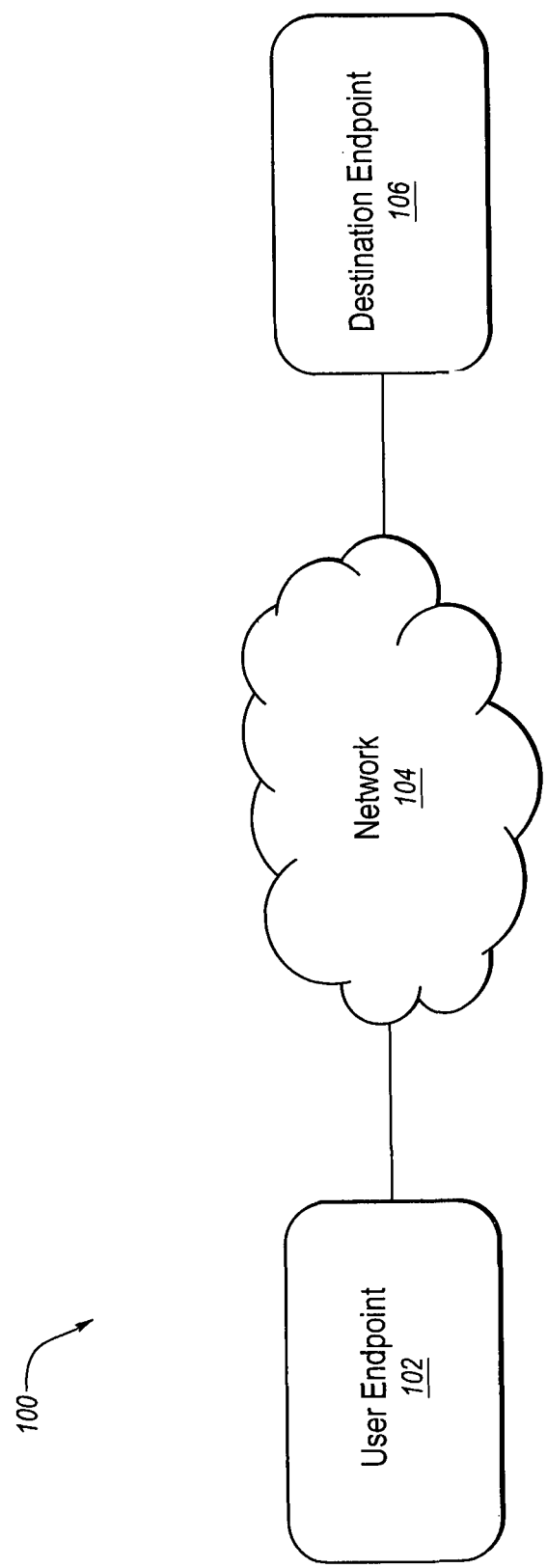
FIG. 1 is a block diagram of a system configured to identify and/or authenticate a network user entity.

In some embodiments of the present disclosure, a user entity of a network (such as the Internet) may be identified and/or authenticated exclusively at the network layer (sometimes referred to as layer 3 in the Open Systems Interconnection (OSI) model of networks) of the network from a network layer packet such as an Internet Protocol (IP) packet. In some embodiments a network layer packet may include unique identification information that may be unique to the user entity. In some embodiments the unique identification information may be associated with a unique user identifier (ID) associated with the user entity. The unique user ID may be independent of a network address (e.g., IP address) from which the network layer packet may originate.

In some embodiments, the unique identification information may be securely signed such that it may be reasonably verified and trusted that the network layer packet was sent by the user entity and not a third party masquerading as the user entity.

Additionally, the unique identification information may be included in any suitable portion of the network layer packet (such as the header) that may be identified and read by components of the network that operate at the network layer. By way of example and not limitation, for an IP version 4 (IPv4) packet, the identification information may be included in the option field of the header of the IPv4 packet. As another example, for an IP version 6 (IPv6) packet, the identification information may be included in the Hop-by-Hop field of the header of the IPv6 packet. Therefore, the user entity may be identified and/or authenticated at the network layer of the network based on the unique identification information. In contrast, traditional authentication methods may be based on unique identification information associated with application layer (sometimes referred to as layer 7) communications of the network. Such traditional authentication methods may not allow network layer elements of the network to adequately identify and authenticate user entities because the network layer elements may not be able to read or access the application layer information.

Additionally, network layer authentication and identification configurations of the present disclosure may allow for multiple user entities to share the same network address and still be uniquely identified and authenticated at the network layer when communicating over the network. In contrast, at the network layer, many traditional user identification and authentication methods rely heavily on identification and authentication of users based on the actual network address, but do not or cannot differentiate between potential different user entities of the same network address at the network layer. Additionally, because the user unique identification information is independent from the network address, the same user entity may be identified regardless of the network address used by the user entity such that traffic from the same user entity may be correlated across different network addresses. In contrast, traditional user network layer identification and authentication based on network addresses does not provide for determining that the same user entity may be using different network addresses.

Further, the user entity from which network traffic originates may be identified at the network layer based on the user unique identification information included in the network layer packet. Accordingly, in some embodiments, traffic communicated by the user entity over the network and intended for a destination point may be verified before being accepted by the intended destination point such that if the user entity does not have permission to communicate with the intended destination point, that communication may be denied. Therefore, the user entity may not even be able to establish a connection with the desired destination point if the user entity has not been granted access, which may substantially reduce the ability of a malicious user entity to generate an attack on the destination point.

For example, to invoke an attack, a malicious user may first need to steal a unique user ID and its associated authentication key of an authorized user entity to even communicate with (and thus send malicious traffic to) a desired destination point, application, or service. Additionally, such malicious activity may be easily recognized as being associated with a particular unique user ID such that access privileges associated with that unique user ID may be revoked. In contrast, current application layer authentication protocols and procedures allow for at least an initial connection and communication with a destination point such that credentials may be given for further access to sensitive information stored at the destination point and not available to all. The initial communication with the destination point may be exploited by malicious user entities to gain unauthorized access to the sensitive information.

Also, because the user entity may be securely identified and authenticated based on the network layer packet, the user entity may be given access to account services provided by the destination point, such as social media, email, banking or any other account services, based on the user unique identification information included in the network layer packet, or a combination of this data and traditional application authority schemes. Therefore, the need for access based on a password (and the associated security risks) may be reduced and/or eliminated, or be augmented. Similarly, identifying a user based on the user unique identification information included in the network layer packets may allow for a common authentication method or account across multiple applications (e.g., banking, social media, online shopping, etc.) or across multiple protocols (http, scp, netbios, ssh, etc.) and may also allow for policy enforcement at multiple network layer points along a traffic path.

Additionally, different user entities may have different privileges with respect to accessing and configuring elements of a network. For example, a network administrator for a given network may have more access privileges than a user of the network. Therefore, in some embodiments, a unique user ID associated with a user entity having more privileges (e.g., the network administrator) may have a policy applied to it to give more access and allow more control than a unique user ID associated with a user entity having fewer privileges.

Embodiments of the present disclosure mentioned above are explained in further detail with reference to the accompanying drawings. FIG. 1 is a block diagram of a system 100 configured to identify and/or authenticate a network user entity, according to some embodiments of the present disclosure. The system 100 may include a user endpoint 102, a network 104 and a destination endpoint 106.

The user endpoint 102 may be any suitable system, apparatus, or device configured to facilitate communication of data by a user entity with the destination endpoint 106 via the network 104. By way of example and not limitation, the user endpoint 102 may be a personal computer, a laptop computer, a cellular phone, a smart phone, a personal data assistant (PDA), a tablet computer, an entertainment device, a navigation device, a server, etc. The user entity may be any suitable entity that may use the user endpoint 102 to communicate with the destination endpoint 106 and may include, by way of example and not limitation, a human user, smart primate, dolphin, daemon, process, service, application, device, component, etc. that may communicate data to the destination endpoint 106 via the user endpoint 102 and network 104. Some examples of applications or services may include a backup or antivirus agent or a web server, application or database process.

The destination endpoint 106 may be any suitable system, apparatus, or device configured to communicate with the user endpoint 102 via the network 104 and may provide data to the user endpoint 106 based on requests generated by the user endpoint 102. In some embodiments, the destination endpoint 106 may be one or more servers, one or more computer readable storage devices or arrays, and/or one or more files included on the one or more servers, storage devices, and/or storage arrays.

The network 104 may be any suitable network and/or fabric configured to communicatively couple the user endpoint 102 to the destination endpoint 106. The network 104 may accordingly be implemented as, or may be a part of, a storage area network (SAN), personal area network (PAN), local area network (LAN), a metropolitan area network (MAN), a wide area network (WAN), a wireless local area network (WLAN), a virtual private network (VPN), a cellular network, an intranet, the Internet or any other appropriate architecture or system that facilitates the communication of signals, data and/or messages (generally referred to as data), or any combination thereof.

The network 104 may transmit data using wireless transmissions and/or wire-line transmissions via any storage and/or communication protocol, including without limitation, Fibre Channel, Frame Relay, Asynchronous Transfer Mode (ATM), Internet protocol (IP), Internet Protocol version 6 (IPv6), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. The network 104 and its various components (which may or may not include the user endpoint 102 and the destination endpoint 106) may be implemented using hardware, software, or any combination thereof.

The user endpoint 102 may communicate data to and request data from the destination endpoint 106 via the use of network layer packets, such as IP packets. The network layer packets may include unique identification information associated with the user entity using the user endpoint 102. In some embodiments, the unique identification information may be based on a unique user ID associated with the user entity. The unique user ID may include any suitable ID that may be uniquely identifiable to an authentication domain (discussed in further detail with respect to FIGS. 2 and 3) and in some embodiments may be a globally unique name associated with the user entity. For example, the unique user ID may include an email address or login ID unique to the user entity. Uniquely identifying data that may be derived from the unique user ID may be included in a portion of the network layer packet such that it may be read and/or accessed by the network layer components. Accordingly, the user entity may be identified by components of an authentication domain to facilitate the application of a policy. In some embodiments, the uniquelyidentifying information may be included in a header of a network layer packet (e.g., an IP packet header) communicated from the user endpoint 102.

In some embodiments, the user unique identification information may be digitally signed using any suitable signing or hashing method. Accordingly, a third party may not be able to easily impersonate the user entity by merely analyzing network layer packets for the unique identification information and including the unique identification information associated with the user entity in network layer packets communicated by the third party. Additionally, in some embodiments, the user unique identification information may be salted with a random or pseudo-random salt to further reduce the risk of a third party being able to impersonate the user entity.

The network layer packets intended for the destination end point 106 from the user endpoint 102 may or may not reach the destination endpoint 106 based on the unique user unique identification information included in the network layer packets. For example, if the user entity is not authorized to communicate with and/or access the destination end point 106, a network layer packet communicated by the user endpoint 102 and intended for the destination endpoint 106 may not reach the destination endpoint 106 based on the network packet being identified as originating from the user entity by the unique user unique identification information included in the network layer packet. In contrast, if the user entity is authorized to communicate with and/or access the destination endpoint, a network layer packet communicated by the user endpoint 102 and intended for the destination endpoint 106 may reach the destination endpoint 106 based on the network layer packet being identified as originating from the user entity by the unique user unique identification information included in the network layer packet.

As discussed in detail below with respect to FIGS. 2 and 3, the determination of whether or not the user entity is authorized to communicate with and/or access the destination endpoint 106 may be based on whether the user entity is enrolled with an authentication domain associated with authorizing access to the destination endpoint 106. Additionally, as discussed further with respect to FIGS. 2 and 3, the authentication domain may be configured to enforce policies associated with granting or denying access to the destination endpoint 106 by the user entity (via the user endpoint 102) based on the unique user unique identification information supplied by the user endpoint 102.

Therefore, the system 100 may be configured to allow or deny access by a user entity (via the user endpoint 102) to a destination endpoint 106 based on unique user unique identification information included in network layer packets communicated from the user endpoint 102 and intended for the destination endpoint 106. As mentioned above, such a configuration may allow for multiple user entities to share the same network address and still be uniquely identified and authenticated when communicating over the network 104. Additionally, because the user unique identification information is independent from the network address, the same user entity may be identified at the network layer regardless of the network address used by the user entity. Further, the user entity from which network traffic originates may be identified based on the user unique identification information included in the network layer packet, which may allow the user entity to access accounts associated with the user entity without other traditional methods, such as a username, account, and/or password. Additionally, in some embodiments, the unique identification information may be used to replace or further augment other forms of authentication currently being used to allow a user entity to access a destination endpoint. For example, the unique identification information may be combined with current authentication methods (e.g., a password) for added security.

Modifications, additions, or omissions may be made to the system 100 of FIG. 1 without departing from the scope of the present disclosure. For example, the number of user endpoints and/or destination endpoints may vary depending on specific situations. For example, a user entity associated with a unique user ID may be actively using multiple user endpoints at a given time such that traffic from all the user endpoints may be associated with the same given unique user ID. Additionally, although not illustrated in FIG. 1, any number of network elements and/or potential enforcement points may be between the user endpoint 102 and the destination endpoint 106. Further, in some embodiments the functionality of the user endpoint 102 with respect to authenticating and identifying the user entity associated with the user endpoint 102 may be based on instructions stored on an easily removable computer readable medium (e.g., a Universal Serial Bus (USB) flash drive, a Secure Digital (SD) card, or any other applicable storage device that may be easily removed, or wireless readable media such as that accessed by, but not limited to, Bluetooth, Radio Frequency (RF) or Near Field Communication (NFC)) included with the user endpoint 102. In another embodiment the stored data may be embedded on a chip, expansion card or inserted module in the user endpoint 102.

Therefore, in some embodiments a user entity may remove the removable computer readable medium from one user endpoint and may insert, install, or attach the removable computer readable medium into another user endpoint such that the user entity may be authenticated and identified using the same authentication scheme, regardless of the user endpoint being used. In other embodiments, each user endpoint may include authentication information associated with the user entity (e.g., via the unique user ID) such that each user endpoint may be associated with the user entity without the use of a removable computer readable medium.

Figure 2:
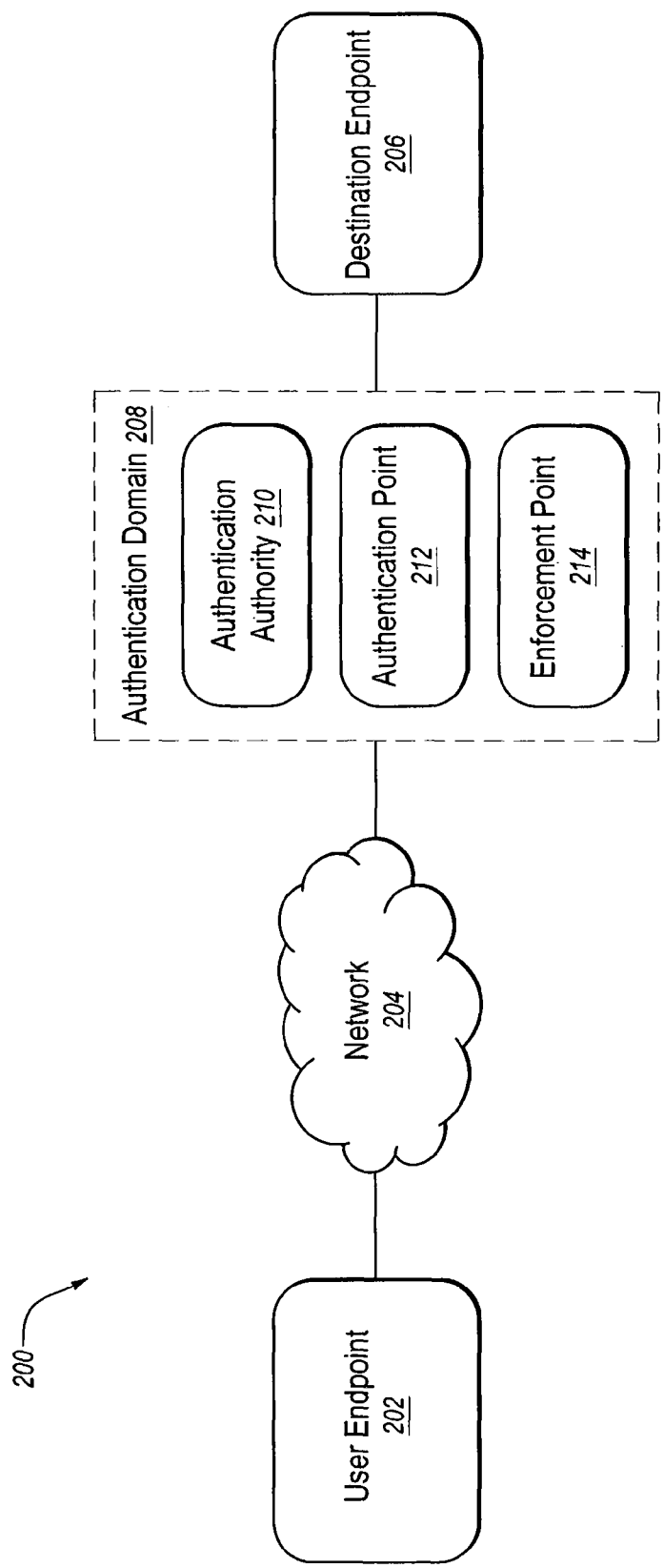
FIG. 2 is a block diagram of an example system configured to regulate access to a destination endpoint by a user endpoint based on unique identification information included in network layer packets.

FIG. 2 is a block diagram of an example system 200 configured to regulate access to a destination endpoint 206 by a user endpoint 202 based on unique identification information included in network layer packets communicated by the user endpoint 202 via a network 204, according to some embodiments of the present disclosure. The user endpoint 202, destination endpoint 206, and network 204 may be substantially similar to the user endpoint 102, destination endpoint 106, and network 104, respectively, described above with respect to FIG. 1. Additionally, the system 200 may include an authentication domain 208 that may include an authentication authority 210, an authentication point 212 and an enforcement point 214. Although illustrated as being separate from the destination endpoint 206, in some embodiments one or more elements of the authentication domain 208 may be included with the destination endpoint 206. Additionally, although illustrated as being separate, one or more of the authentication authority 210, the authentication point 212 and the enforcement point 214 may be included in the same element or module.

The authentication domain 208 may be a trust or administrative domain where one or more servers, endpoints, or policy enforcement devices have a common view of a user identity, such as the user identity of the user entity associated with the user endpoint 202. Accordingly, the authentication domain 208 may be configured to allow or disallow communication with one or more destination endpoints associated with the authentication domain 208 based on the identity of a user entity. In the illustrated embodiment, the authentication domain 208 may be associated with the destination endpoint 206 and, therefore, may be configured to allow or disallow communication with the destination endpoint 206 either by enforcing policy in the network path or by denying access directly on the destination endpoint 206.

The authentication authority 210 of the authentication domain 208 may include any suitable system, apparatus, module, or device configured to securely store a master authentication database for the authentication domain 208. The master authentication database may include information that may be used to identify and authenticate user entities (referred to hereinafter as user profiles). The master authentication database included with the authentication authority 210 may also include information that may allow enforcement points and authentication points of the authentication domain 208, such as the authentication point 212 and the enforcement point 214, to share data associated with identifying and authenticating the user entity and/or enforcing policies associated with the user entity.

The enforcement point 214 may be any suitable system, apparatus, module, or device that may enforce a policy on network layer traffic that it receives or that it passes. The policy enforcement may include any number of guises, and may include access policy, service policy (such as Quality of Service (QoS)), routing policy, logging, monitoring, audit policy, or any other similar. policy. By way of example and not limitation, the enforcement point 214 may include a firewall, a router, a proxy server, a web server, a database server, a switch, a billing system, a monitoring device, etc. The enforcement point 214 may also be configured to perform the enforcement at the network layer of the network.

The authentication point 212 may be any suitable system, apparatus, module or device that the user endpoint 202 may communicate with to provide credentials to be authenticated with the authentication domain 208. In some embodiments, the authentication point 212 may be included with the enforcement point 214 point, and in other embodiments the authentication point 212 may be a separate element. The authentication point 212 may also be configured to perform the authentication at the network layer of the network.

In some embodiments, the user entity associated with the user endpoint 202 may be identified, authenticated, and granted or denied access to the destination endpoint 206 at the network layer of the network by the authentication domain 208 based on a process that includes enrolment of the user entity with the authentication domain 208, authentication of the user entity by the authentication domain 208, and the transmission of authenticated and signed data flows between the user endpoint 202, the authentication domain 208 and the destination endpoint 206 based on the enrolment and authentication.

Modifications, additions, or omissions may be made to the system 200 without departing from the scope of the present disclosure. For example, in some embodiments, the user endpoint 202 and/or the destination endpoint 206 may be included in the authentication domain 208.

Additionally, in these or other embodiments, the authentication domain 208 may be included in a hierarchal type structure where the authentication domain 208 may act as a central authenticator for one or more destination endpoints such that the user entity may communicate with a destination endpoint without the entity associated with the destination endpoint being privy to identifiable data about the user entity. By way of example, the authentication domain 208 may be associated with a commercial authentication provider, a network service provider (e.g., an Internet service provider (ISP), or a government. In such embodiments, the authentication domain 208 may provide authentication services to hosting customers such that the hosting customers may trust incoming traffic based on the authentication service provided by the authentication domain 208 without ever being privy to the identification information associated with the user entity.

In some of such embodiments, various hierarchal levels of authentication services may be provided. For example, a government may provide authentication services to top level authentication providers, who may in turn provide services down a chain to tier 1 ISP's, who may then provide authentication services to tier 2 ISP's who may provide authentication services to hosting providers, who may then provide authentication services to server hosting customers who may then authenticate users based on the series of authentications. It is understood that any number of the above described hierarchal levels may be removed and/or others may be added to the above example. Additionally, enrolment and/or authentication to hierarchal authentication domains may be provided from higher tier authentication domains using a vouching system, or by using authentication proxy mechanisms.

Figure 3:
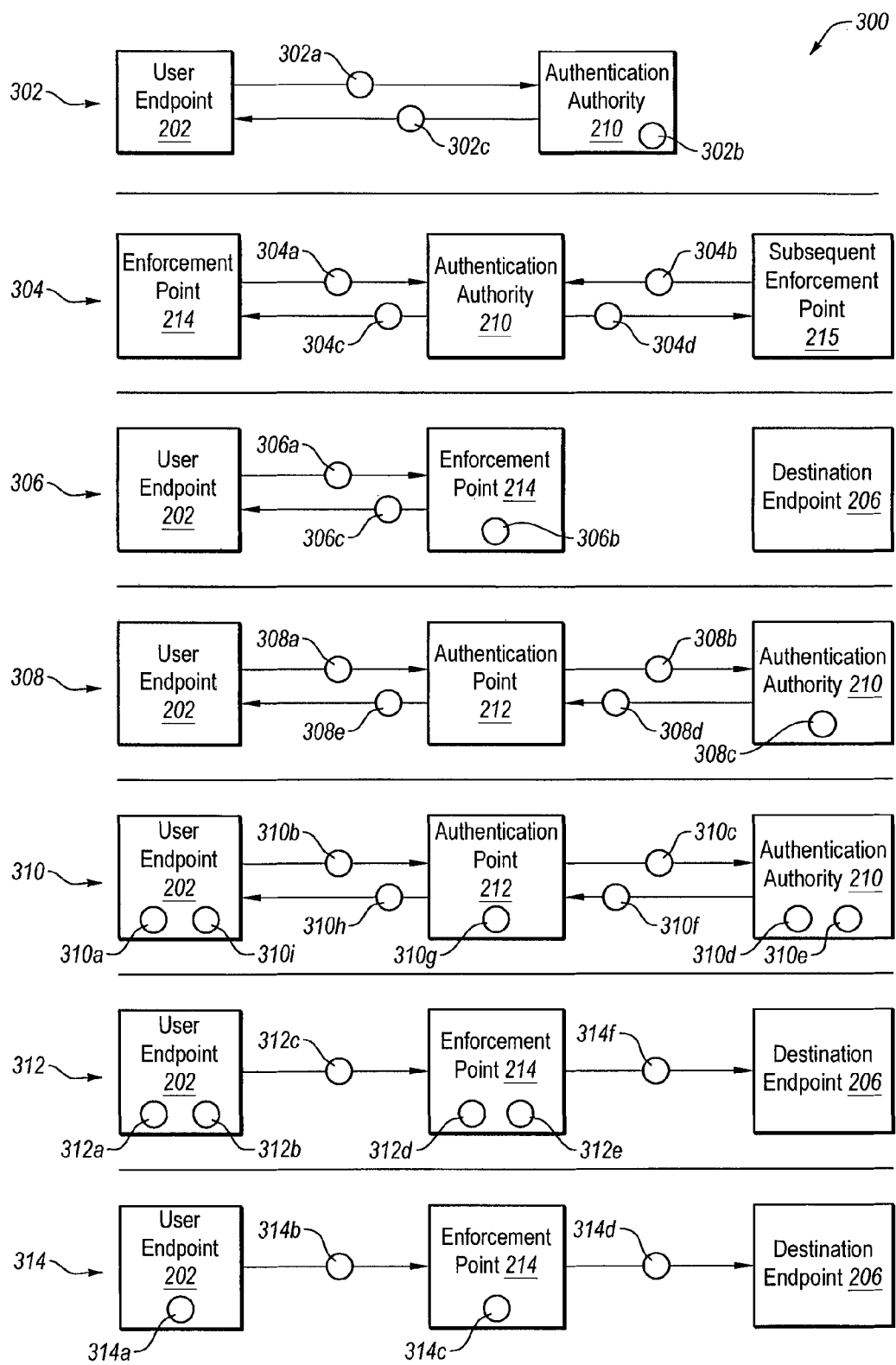
FIG. 3 illustrates an example process that may be used to perform the enrolment, authentication and transmission of data flows between a user endpoint and a destination endpoint.

FIG. 3 illustrates an example process 300 that may be used to perform the enrolment, authentication and transmission of data flows between the user endpoint 202, the various elements of the authentication domain 208 and the destination endpoint 206, according to some embodiments of the present disclosure.

At a user entity enrolment phase 302 of the process 300, the user endpoint 202 may initiate a connection to the authentication authority 210 to initiate an enrolment process at a step 302a. In some embodiments, the network communication may include a unique user ID associated with the user entity and/or other information that may be used to adequately identify the user entity. For example, if the enrolment is for access to banking services, the unique identification information may include one or more account numbers, government ID's, postal or email addresses associated with account numbers, etc. Additionally, in some embodiments the digital signature of the user entity may be generated using symmetric, asymmetric or public/private key pairs. In these embodiments, the user endpoint 202 may generate a shared key or a public/private key pair to facilitate the creation of data used in the enrolment process. Accordingly, in these embodiments, the user endpoint 202 may include in the network layer packet communicated to the authentication authority 210 the public key associated with the user entity.

If adequate identifying data is provided to the authentication authority 210, then the authentication authority 210 may enroll the user entity at a step 302b. During enrolment of the user entity, the authentication authority 210 may store in a user profile associated with the user entity the unique user ID associated with the user entity and received at the step 302a. In embodiments where a public/private key exchange may be used, the authentication authority 210 may also store the public key associated with the user entity (which may be included in the network connection established at the step 302a) at the step 302b. In embodiments where symmetric keys may be used, the authentication authority 201 may also generate a unique entity key associated with the user entity at the step 302b. The unique entity key may be a shared key that may be used to authenticate the digital signature of the user entity. Further, in some embodiments, the authentication authority 210 may generate a salt for the user entity that may be used to salt the unique user ID of the user entity for an added security measure.

Further, in some embodiments, during the enrolment of the user entity, the authentication authority may generate a policy associated with the user entity. The policy may dictate which destination endpoints, such as the destination endpoint 206, the user endpoint 202 may communicate with based on the credentials given in the step 302a. For example, a user entity identified as a system administrator by the credentials given in the step 302a may have a policy associated with it that gives the user entity more access to one or more destination endpoints than a user entity identified as merely a user of the system. This policy may later be distributed to enforcement points associated with the authentication domain 208.

At a step 302c, the authentication authority 210 may communicate to the user endpoint 202 over the network connection that the user endpoint 202 has been enrolled with the authentication authority 210. In embodiments where the authentication authority 210 generates a shared key used for authentication, the authentication authority 210 may also communicate the shared key to the user endpoint 202 at the step 302c. In embodiments where the verification is based on a public/private key scheme, the authentication authority 210 may communicate its public key to the user endpoint 202 at the step 302c. Additionally, in embodiments where the authentication authority 210 generates a salt for the user entity, the authentication authority 210 may communicate the salt generated for the user entity.

In some embodiments, the communication may include other information related to the authentication domain 208 such as, which network addresses may belong to the authentication domain 208 and/or the elements (e.g., enforcement points, authentication points, enrolment points (such as the authentication authority 210) etc.) and their associated information (e.g., public keys, shared keys, network addresses, etc.) that may be included as authorized members of the authentication domain 208). Additionally, in some embodiments, the communication may include authentication information associated with the authentication domain 208 and its associated elements.

For example, the authentication information may include an indication that communication with one or more destination endpoints, enforcement points, or authentication points may require authentication, authentication mechanisms used within the authentication domain 208, key lengths, encryption types used, hash lengths used for authentication key expiration data, authentication domain element expiration data (e.g., enforcement points, authentication points, enrolment points etc.), etc. In any of these embodiments, the user endpoint 202 may store the received key and any other applicable information related to the authentication domain 208 in an authentication domain profile associated with the authentication domain 208. Additionally, in some embodiments, the authentication domain profile may include a globally unique authentication domain identifier such that the identifier may uniquely identify the authentication domain the data may refer to.

In some embodiments, the received authentication domain profile data as well as other sensitive information associated with the user entity (e.g., the unique user ID, unique entity keys, any authentication key materials or entity session keys) may be securely stored using any suitable secure storage mechanism such that the information may not be easily accessed by unauthorized parties. For example, this information may be secured by a password, a personal identification number (PIN), a biometric authentication scheme, a hardware token, etc.

Accordingly, through the phase 302, the user entity may be enrolled with the authentication authority 210 such that future communications with the destination endpoint 206 (which may be associated with the authentication authority 210) may be allowed or disallowed based on a policy associated with the user entity generated during enrolment.

The process 300 may also include an enforcement point and authentication point enrolment phase 304 in which one or more enforcement points, such as the enforcement point 214 and a subsequent enforcement point 215, may also enroll with the authentication authority 210 such that the enforcement points may securely communicate with the authentication authority 210. For example, at steps 304a and 304b, the enforcement point 214 and the subsequent enforcement point 215, respectively, may communicate identification and enrolment information to the authentication authority 210. At steps 304c and 304d, the authentication authority 210 may communicate shared secrets (e.g., an authentication key) or exchange key pairs with the enforcement point 214 and the subsequent enforcement point 215 such that the authentication authority 210 and the enforcement points may establish secure connections. Additionally, at steps 304c and 304d, the authentication authority 210 may communicate to the enforcement point 314 and the subsequent enforcement point 315, respectively, profile data associated with enrolled user entities (e.g., unique identification numbers, policies, shared keys, etc., that may be associated with the enrolled user entities). Further, although not explicitly illustrated a similar enrolment process may occur with respect to authentication points of the authentication domain 208.

Additionally, in some embodiments, once the enforcement points are enrolled in the phase 304, the authentication authority 210 may communicate the information associated with the enforcement points or authentication points to the user endpoint 202 in another step that is not explicitly illustrated. Accordingly, the user endpoint 202 may store the information associated with the enforcement points or authentication points in the authentication domain profile associated with the authentication domain 208 such that the user endpoint 202 may identify and securely communicate with the enforcement or authentication points associated with the authentication domain 208. This process may ensure that a user entity is protected from being referred for authentication with a malicious enforcement or authentication point, or one that is masquerading as a legitimate enforcement of authentication point.

The process 300 may additionally include an authentication commencement phase 306. During the authentication commencement phase 306, the user endpoint 202, (which may be associated with the enrolled user entity), may attempt to communicate with the destination endpoint 206 at a step 306a by sending a network layer packet. However, the enforcement point 214 may be configured to intercept traffic intended for the destination endpoint 206 such that the network layer packet may be received by the enforcement point 214.

Therefore, at a step 306b, the enforcement point 214 may receive the network layer packet and check the policy associated with access to the destination endpoint 206. In some embodiments, the enforcement point 214 may determine that traffic flows to be received by the destination endpoint 206 may require authentication based on the policy. If the received network layer packet already contains identification and authentication information associated with the user entity, then the identification and authentication information may be looked up against a local lookup table included with the enforcement point 214 to try and identify and verify the identity of the user entity. However, in the illustrated example, the user entity may not have been authenticated yet.

Consequently, at a step 306c, the enforcement point 214 may discard or buffer the network layer packet received from the user endpoint 202 and may communicate an "Authentication Required" notification message to the user endpoint 202. In some embodiments, the notification message may be included in an Internet Control Message Protocol (ICMP) message. Additionally, in some embodiments, the notification message may include details as to which authentication point (e.g., the authentication point 212) the user entity should contact (via the user endpoint 202) to provide its authentication credentials. As mentioned above, in some embodiments, the authentication point 212 may be included with the enforcement point 214. Additionally, in some embodiments, the notification message may be signed by the enforcement point 214 using any acceptable authentication function such that the user endpoint 202 may verify that the notification message originated from the enforcement point 214 and not a malicious third party.

For example, the enforcement point 214 may sign the notification message using a shared key generated for the user entity in the enrolment phase 302. As another example, the enforcement point 214 may sign the notification message using a private key and the user endpoint may verify that the notification message originated from the enforcement point 214 by applying a public key associated with the enforcement point 214 to the message.

At a step 308a of an authentication phase 308, based on the notification message, the user endpoint 202 may build a secure connection to the authentication point indicated in the notification message, which in the illustrated example may be the authentication point 212. In other embodiments, the user endpoint 202 may build the secure connection based on information stored thereon indicating that authentication may be required before communication with the destination endpoint 206 may be effectuated.

The user endpoint 202 may build the secure connection to the authentication point 212 using any suitable secure transport mechanism that may generate a secure connection, such as transport layer security (TLS) connection. Additionally, in generating the secure connection with the authentication point 212, the user endpoint 202 may include unique identification information such as the unique user ID associated with the user entity. In some embodiments, the data may be digitally signed. The unique identification information may accordingly be used to indicate to the authentication point 212 which user entity is attempting to authenticate itself.

At a step 308b, the authentication point 212 may forward the unique identification information to the authentication authority 210. The authentication point 212 may also forward information associated with the authentication point 212 to the authentication authority 210 such that the authentication authority 210 may identify and authenticate the authentication point 212.

At a step 308c, the authentication authority 210 may determine whether or not the user entity associated with the unique user ID is enrolled with the authentication authority 210. The authentication authority 210 may also determine whether the user entity (via the user endpoint 202) is permitted to authenticate with the authentication point 212. If the user entity is permitted to authenticate with the authentication point 212, the authentication authority 210 may issue a challenge and communicate the challenge to the authentication point 212 at a step 308d. In some embodiments, the challenge may include time sensitive information to prevent reuse and may be signed by the authentication authority 210's private key to ensure validity.

At a step 308e, the authentication point 212 may communicate the challenge to the user endpoint 202 via the secure communication between the authentication point 212 and the user endpoint 202. It may be noted that in some embodiments, the user endpoint 202 may not communicate with the authentication authority 210 directly other than during enrolment at the enrolment phase 302 discussed above.

During a challenge response phase 310, the user endpoint 202 may receive the challenge, check the time limit on the challenge (if applicable) and additionally verify that the request is correctly signed (e.g., using the shared key or a public key associated with the authentication authority 210) at a step 310a. Additionally, at the step 310a, the user endpoint 202 may generate a response to the challenge and sign the response through a one way hash process. In some embodiments, the hash process may use the unique entity, key provided to the user endpoint 202 by the authentication authority 210 at enrolment to sign the response based on the unique user ID and unique entity key. In other embodiments, the hash process may use a private key of a private/public key pair associated with the user entity. In both of these embodiments, the hash process may or may not include salting the unique user ID with a salt associated with the user entity that may be provided by the authentication authority 210 during the enrolment phase 302.

At a step 310b the user endpoint 202 may communicate the signed challenge response to the authentication point 212. At a step 310c, the authentication point 212 may forward the signed challenge response to the authentication authority 210 such that the authentication authority 210 may validate the challenge response.

At a step 310d, the authentication authority 210 may run the same one way hash process used by the user entity to sign the challenge response at the step 310a using the appropriate key and, if used, salt associated with the user entity (which may be stored in the user profile associated with the user entity that may also include the unique user ID). If the result matches the challenge, then the authentication is a success.

In some embodiments, at a step 310e, the authentication authority 210 may assign. an entity address ID to the user entity. The entity address ID may uniquely identify the user entity for the network address (e.g., IP address) and may also be stored at the authentication authority 210 in the user profile associated with the user entity. In some embodiments, the network address associated with the entity address ID may also be stored in the user profile as a subscribed network address. Additionally, at the step 310e, the authentication authority 210 may assign an entity session key to the user entity. The entity session key may be unique for each subscribed network address that the user entity may use and may provide the capability to identify the same user entityID on multiple subscribed network addresses but still differentiate the traffic between the user entity's endpoints.

Further, if Network Address Translation (NAT) is in use on the network path between the user endpoint 202 and elements of the authentication domain 208 then a Subscribed NAT address may be added to the user profile stored on the authentication authority 210. This may allow for a single unique user ID being stored within the authentication authority 210, but with a source address and a translated source address to be identified as deriving from the same user endpoint 202. In this embodiment, an authentication point or enforcement point in the authentication domain 208 may see traffic sourced from a genuine subscribed network address and another authentication or enforcement point may see traffic sourced from the Subscribed NAT address. In this case, both addresses may be readily associated with the same user endpoint 202 and its associated user entity.

At a step 310f, the authentication authority 210 may communicate the assigned entity address ID and entity session key to the authentication point 212. Additionally, in some embodiments, the message communicated at the step 310f may include an "Authentication Successful" message to inform the authentication point 212 that the user entity was indeed authenticated.

At a step 310g, the authentication point 212 may store information about the newly authenticated user entity in a user profile associated with the user entity. The information may include the unique user id, the entity session key, the entity address ID and the subscribed network address associated with the user entity. Accordingly, the authentication point 212 may be allowed to quickly deal with authenticated traffic received from the user endpoint 202.

At a step 310h, the authentication point 212 may communicate the entity session key and the entity address ID to the user endpoint 202 with an "Authentication Successful" message. At the step 310i, the user entity 202 may update the authentication domain profile associated with the authentication domain 208 to include the entity address ID and entity session key by securely storing the respective information. During this process, the authentication domain profile may also be updated on the user endpoint 202 to reflect other changes in the authentication domain, such as changes in the enforcement or authentication points. Following the step 310i, the secure channel connection to the authentication point 212 may be closed.

In a data flow initiation phase 312, the user endpoint 202 may again attempt to connect to the destination endpoint 206 at a step 312a. However, this time, based on the updated Authentication Domain profile or the ICMP "Authentication Required" message, the user endpoint 202 may know that the packet flow should be authenticated. Accordingly, at the step 312a, the user endpoint 202 may generate a unique data string from the entity address ID and a "one time" flow identifier that is locally created by the user endpoint 202. The flow identifier may include a strictly monotonically increasing number (a number where each iteration is greater than the last), as well as a pseudo random number or a random number to help reduce the predictability of the flow identifier. In some embodiments, the to entity address ID and flow identifier may be salted with some psuedo-random data based on the salt stored in the authentication domain profile associated with the authentication domain 208.

At a step 312b, the user endpoint 202 may sign the unique data string using a hashing function based on the entity session key to generate a unique session token. The unique session token may be added to the unique data string that may be included in a network layer packet (e.g., included in the IP header) of the packet flow. In some embodiments, the signing process may also use the destination network address to afford improved anti-replay protection.

At a step 312c, the network layer packet may be sent toward the destination endpoint 206 and may be intercepted by the enforcement point 214 at a step 312d. At the step 312d, the enforcement point 214 may again check the policy associated with communications with the destination endpoint 206, which may again dictate that authentication of the user entity may be required for communication with the destination endpoint 206.

In some embodiments, the enforcement point 214 may check the network address and the entity address ID to verify that the user entity has been authenticated. The enforcement point 214 may then retrieve the entity session key and the unique user ID that may correspond to the subscribed network address and entity address ID.

At a step 312e, the enforcement point 214, using the entity session key, may run the same hashing function used by the user endpoint 202 to create the unique session token. If the results match, then the enforcement point 214 may identify and authenticate the network layer packet as originating from the user entity and a policy associated with the user entity may be applied.

At a step 312f, assuming that the policy allows the access, the enforcement point 214 may forward the network layer packet to the destination endpoint 206. Additionally, session data may be added to an enforcement point state table. The state table entries may include any suitable information such as the source address used to send the network layer packet (e.g., Source (Src) IP), the network address marked as the destination for the network layer packet (e.g., Destination (Dst) IP), the protocol type being used in the communication, the source (Src) Port of the network layer packet, the destination (Dest) Port of the network layer packet, and the Flow Identifier described above.

In a continuing flow phase 314, further network layer packets that are to be transmitted in the flow may have the same flow identifier, unique data string, and unique session token inserted therein (e.g., in the header) at a step 314a. Accordingly, in some embodiments, the user endpoint 202 may not produce the unique data string and unique session token for each network layer packet included in the same flow. Instead, the data may simply be cached and added to each network layer packet included in the flow. However, this data may only work to authenticate network layer packets that may be in the same flow as they may have to match the state table entry of the enforcement point 214. Accordingly, if the further network layer packets are not part of the same flow, another unique data string and unique session token associated with another flow may be generated as described above.

At a step 314b, further network layer packets may be communicated toward the destination end point 206. At a step 314c, the further network layer packets may arrive at the enforcement point 214. Additionally, at the step 314c, the enforcement point 206 may check the further network layer packets against the state table. In some embodiments, the further network layer packets may be passed in a "Fast Path" and may not be authenticated if the further network layer packets are included in the same previously authenticated flow. If the further network layer packets are not part of the same previously authenticated flow, the further network layer packets may be authenticated as described above. This 'Fast Path' functionality may allow for reduced processing time for each subsequent packet of a flow and may greatly increase the scale and performance of one or more embodiments described herein.

At a step 314d, the enforcement point 214 may forward the further network layer packets to the destination endpoint 206. Response network layer packets generated by the destination endpoint 206 based on the further network layer packets received from the user endpoint 202 may also be accepted as the flow resides in the state table. This aspect of dealing with return path traffic may works in the same way as most stateful firewalls on the market today.

Therefore, the process 300 may be used to enroll a user entity, authenticate the user entity and verify traffic originating from the user entity based on unique identification information associated with the user entity included with network layer packets. As such the user entity may be identified and authenticated at the network layer, which may improve security as explained above.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, two endpoints communicating with each other may reside in the same or in separate authentication domains. These endpoints may each authenticate their data flows destined for the opposing endpoint and in this embodiment both may act as clients and enforcement points. In this case, the authentication process may happen independently in each direction and as such, the authentication of traffic in each direction may be considered stateless.

Further, although the above description is given with respect to network layer packets being received by one enforcement point (e.g., the enforcement point 214) before being forwarded to the destination endpoint 206, any number of enforcement points may be included in the traffic path between the user endpoint 202 and the destination endpoint 206 to apply various policies associated with communicating with the destination endpoint 206. For example, a traffic path between the user endpoint 202 and the destination endpoint 206 may include a router, a firewall, and a proxy server that may each be configured as enforcement points. Accordingly, each of the router, firewall, and proxy server may enforce one or more policies associated with communication by the user endpoint 202 with the destination endpoint 206 based on the identification information associated with the user endpoint 202 that may be included in network layer packets.

Further, in some embodiments, one or more subsequent elements of the authentication domain 208 that may receive the network layer packets after authentication of the user entity may be configured to merely identify the user entity associated with the identification information included in the network layer packet and may not necessarily perform authentication of the user entity again. In some of these embodiments, the subsequent elements may apply policy based on the identification of the user entity. Additionally, the above process 300 is merely an example implementation of how the identification and authentication of user entities at the network layer may be accomplished. Any number of variations may be applied without departing from the scope of the present disclosure.

Additionally, when a network flow crosses multiple authentication domains, there may be a requirement to authenticate the flow against a plurality of these authentication domains. In these embodiments, authentication data may be added to the network layer packet to provide identification and authentication for multiple enforcement points in differing authentication domains. To facilitate this process, a single flow identifier or unique data string may be used but signed with multiple entity session tokens. In these embodiments, the network layer packet may contain multiple hashes and an authentication domain may require a capability to identify the signing data applicable to it. To enable this capability, each authentication domain may have a globally unique authentication domain identifier which may be a value that may be unique to the domain.

During authentication, a user entity (via a user endpoint) may retrieve the globally unique authentication domain identifier to identify the domain from its profile data. Upon authentication, the user entity may exchange a locally significant authentication domain identifier with the authentication domain, this value being one that may only be known to the user entity and the authentication domain. This value may then be used in the network layer packet to enable the authentication domain to identify the correct signing data to use to authenticate the user entity at the authentication point. Using this exchanged value in the network layer packet may also prevent the revealing of which authentication domain the data is intended for to other parties who may be monitoring the traffic flow.

Also, in some embodiments, enforcement points and/or authentication points may reside on different authentication domains. In such embodiments, a user entity (via a user endpoint) may include authenticating data in the network layer packet such that the user entity may successfully authenticate with multiple authentication domains in the traffic path. In these embodiments a common flow identifier or unique data string may be used with different authenticating information for each authentication domain. Accordingly, each authentication domain may only identify and authenticate a user entity for its own domain and may not identify identity information intended for another party (e.g., another authentication domain). Further, the locally significant authentication domain identifier may be used to associate the authenticating data with a given authentication domain, allowing an enforcement point to identify the correct associated authenticating data to use for authentication with its given authentication domain.

Furthermore, although a specific use of enforcing policies based on identifying a user entity according to identification information associated with the user entity is described, identifying a user entity based on identification information that may be read at the network layer may have a variety of other uses. Listed below are some examples of the potential uses, but uses other than those specifically given are also within the scope of the present disclosure.

For example, as each packet flow may be authenticated as being owned by a given user entity, logging, audit and billing data may be maintained in a more consistent manner because there may be not need to associate a specific device to a user entity and user entities of multiple devices and network addresses may have their respective data easily associated with the user entity. Also, it may be possible to collect logging, audit and billing data for multiple user entities on a device, or even to collect data about services and applications. In some instances, such an embodiment may allow for the access of premium services (such as access to entertainment over the network) paid for by the user entity to be associated with the user entity and not a device. Accordingly, the user entity may have more flexibility in accessing such premium services. Additionally, for long term logging of data, the complication of correlating logging data with the same user entity that may use many devices or for a user entity that may share a network address may be much simpler as the identity of the user entity may be captured within the packet flow.

Additionally, identifying that a given user entity is generating traffic based on the identification information may facilitate identifying trends in traffic, assist with troubleshooting and identify problem processes, malware or rogue applications. Such identification may also be easier to troubleshoot network and applications problems as a given traffic spike can be identified down to a user or process level. Similarly, if a user entity is a roaming user who may use different network addresses, subnets or even offices, it may be possible to correlate traffic to the same user entity.

Further, by using user entity identification and authentication at the network layer, a user endpoint, such as a home or work computer, may be enrolled with a banking system. The bank may employ a firewall with user authentication controls to its associated banking site or even apply the controls on the web servers themselves. In such instances, an attempt to connect to the banking site from another device that is not enrolled and/or authenticated may cause the authentication process to be initiated. Therefore, without the key materials supplied during enrolment, a malicious user may not even open a TCP session to the banking system and may not even be able to attempt to supply credentials.

This way, if a user entity's username and/or password are stolen (e.g., via a phishing scam), this will not be sufficient for a malicious user to gain access to the user entity's account. This technology may be employed in place of expensive hardware token solutions and may grant excellent protection as the malicious user may not even be presented with a login page.

Similarly, an e-commerce site may either have its own Authentication Domain that a user entity must enroll with, or it could use a trusted Authentication Hosting Service. Any attempt to proceed to checkout may enforce that Authentication is provided and ensure that the user entity is enrolled with the service. Therefore, it may be far harder to commit online credit card fraud if web sites insisted that a user entity was enrolled. Additionally, the authentication may be used to prevent user entities on shared devices from performing purchases using each other's accounts. In some embodiments, the enrolment process may even involve sending a written PIN or password to the user entity's billing address so that a fraudulent user cannot attempt to enroll. In some of these embodiments, a centralized authentication authority similar to the PayPal® method may be used where the site in question does not need to learn of the identity of the user entity, but simply that the user entity has been vouched for by a trusted authentication domain may be used.

Further, using a either a centralized or federated authentication mechanism for Simple Mail Transfer Protocol (SMTP) servers may potentially greatly reduce spam in the Internet. Creators of unsolicited mass mail typically go to great lengths to hide their identity and typically, the mail is produced by the PC's of unaware users who have malware installed or have become part of a botnet. Therefore, by authenticating packet flows to verify that connections are from legitimate sources, it may be possible to reduce the entry points into the mail relay network where spam may enter.

Of course, any poorly protected legitimate host may become a route for spam to enter the network but if a device is producing a lot of spam, or other malicious traffic, then it may be identified from its unique user ID and reputational data may be collected. The more malicious or unwanted traffic the device creates, the greater the downgrade it may get from a reputation authority. Before accepting a connection from another host, an SMTP server may verify the reputation of another device and if it is a known spam source, refuse to accept the TCP connection.

Similarly these controls could be provided for any number of device types on the Internet that may receive a "downgrade" on their reputation. Compromised devices that are part of a botnet, devices that are known to port scan or commit denial of service attacks may all be given a negative reputation. Even if the device changes its network address, authentication data may be used to track the device.

Additionally, if a device is not compromised and is just sending malicious data without supplying user credentials in the network layer packet, it may be possible for sites to simply deny access to unauthenticated traffic if desired. Accordingly, devices that are compromised and are associated with a low reputation user identity may be blacklisted and the identity may be passed up to the authentication domain responsible for authenticating the user so that the company or individual who owns the device can be informed. Having the opportunity to identify the user entity or associated device offers the capability to track the device and/or entity down and for action to be taken.

Reputation services are also a possible service model that may be provided to entities hosting web pages and providing network services. For example, reputational data may be collected based on authenticated traffic on the network and user entities and their associated devices that are compromised or causing problems may be provided to customers in a grey or black list so that the traffic associated with the user entity may be discarded or have some other policy applied to it based on the black or grey list. In some embodiments, this may be done at Internet endpoints such as Enterprise networks, or may be provided as a service by ISP's.

As mentioned earlier, the above listed use cases are merely examples of how the identification information included in network layer packets and read at the network layer may improve the security and reduce the effectiveness of malicious uses of a network. It is understood that any number of other uses of the identification information included in the network layer packets may fall within the scope of the present disclosure.

The embodiments described herein may include the use of a special purpose or general-purpose computer including various computer hardware or software modules, as discussed in greater detail below.

Embodiments within the scope of the present disclosure also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method of identifying and authenticating a network user comprising:
   receiving, at a network layer of a network, a first Internet Protocol (IP) version 4 (IPv4) packet from a first user entity, wherein the network layer of the network is layer 3 in an Open Systems Interconnection (OSI) model of the network and wherein the first IPv4 packet includes a first IPv4 packet header that includes:
   a first network address; and
   first unique identification information that identifies the first user entity, is unique to the first user entity, and is independent of the first network address; and
   verifying, at the network layer with the first IPv4 packet header and without use of layers of the OSI model higher than the network layer, that the first IPv4 packet is from the first user entity based on the first unique identification information included in the first IPv4 packet header.

2. The method of claim 1, further comprising:
   receiving, at the network layer of the network, a second IPv4 packet from a second user entity, wherein the second IPv4 packet includes a second IPv4 packet header that includes:
   the first network address; and
   second unique identification information that identifies the second user entity, is unique to the second user entity, and is independent of the first network address; and
   verifying, at the network layer with the second IPv4 packet header, that the second IPv4 packet is from the second user entity based on the second unique identification information included in the second IPv4 packet header.

3. The method of claim 1, further comprising:
   receiving, at the network layer of the network, a second IPv4 packet from the first user entity, wherein the second IPv4 packet includes a second IPv4 packet header that includes:
   a second network address different from the first network address; and
   the first unique identification information; and
   verifying, at the network layer with the second IPv4 packet header, that the second IPv4 packet is from the first user entity based on the first unique identification information included in the second IPv4 packet header.

4. The method of claim 1, wherein the first unique identification information includes a digital signature associated with the first user entity and the method further comprises verifying that the first IPv4 packet is from the first user entity based on the digital signature associated with the first user entity, the digital signature generated based on a key shared by the first user entity and an authentication domain configured to perform the verifying.

5. The method of claim 1, wherein the first unique identification information includes a digital signature associated with the first user entity and the method further comprises verifying that the first IPv4 packet is from the first user entity based on the digital signature associated with the first user entity, the digital signature generated based on a public/private key pair authentication scheme.

6. The method of claim 1, further comprising applying a policy to the received first IPv4 packet based on the first unique identification information and allowing or disallowing receipt of the first IPv4 packet at an intended destination endpoint based on application of the policy.

7. The method of claim 6, further comprising applying the policy anywhere in a path within the network layer and between the first user entity and an intended destination endpoint.

8. The method of claim 6, further comprising applying the policy at a plurality of points included in a path within the network layer and between the first user entity and an intended destination point.

9. The method of claim 1, further comprising associating a malicious attack with the first user identification information.

10. The method of claim 1, further comprising identifying the first user entity based on the first user identification information after verifying that the first IPv4 packet is from the first user entity without re-verifying that the first IPv4 packet is from the first user entity.

11. The method of claim 1, further comprising verifying that the first IPv4 packet is from the first user entity based on the first unique identification information before allowing reception of the first IPv4 packet by an intended destination endpoint.

12. The method of claim 1, further comprising allowing reception of the first IPv4 packet by an intended destination endpoint based on the first unique identification information.

13. The method of claim 12, further comprising allowing reception of one or more IPv4 packets subsequent to the first IPv4 packet by the destination endpoint based on the first unique identification information.

14. A processor configured to execute computer instructions to cause a system to perform operations for identifying and authenticating a network user, the operations comprising:
   receiving, at a network layer of a network, a first Internet Protocol (IP) version 6 (IPv6) packet from a first user entity, wherein the network layer of the network is layer 3 in an Open Systems Interconnection (OSI) model of the network and wherein the first IPv6 packet includes:
      a first IPv6 packet header that includes a first IP address; and
      a first Hop-by-Hop field that includes first unique identification information that identifies the first user entity, is unique to the first user entity, and is independent of the first IP address; and
   verifying, at the network layer with the first Hop-by-Hop field and without use of layers of the OSI model higher than the network layer, that the first IPv6 packet is from the first user entity based on the first unique identification information included in the first Hop-by-Hop field of the first IPv6 packet.

15. The processor of claim 14, wherein the operations further comprise:
   receiving, at the network layer of the network, a second IPv6 packet from a second user entity, wherein the second IPv6 packet includes:
      a second IPv6 packet header that includes the first IP address; and
      a second Hop-by-Hop field that includes second unique identification information that identifies the second user entity, is unique to the second user entity, and is independent of the first IP address; and
   verifying, at the network layer with the second Hop-by-Hop field, that the second IPv6 packet is from the second user entity based on the second unique identification information included in the second Hop-by-Hop field of the second IPv6 packet.

16. The processor of claim 14, wherein the operations further comprise:
   receiving, at the network layer of the network, a second IPv6 packet from the first user entity, wherein the second IPv6 packet includes:
      a second IPv6 packet header that includes a second IP address different from the first IP address; and
      a second Hop-by-Hop field that includes the first unique identification information; and
   verifying, at the network layer with the second Hop-by-Hop field, that the second IPv6 packet is from the first user entity based on the first unique identification information included in the second Hop-by-Hop field of the second IPv6 packet.

17. The processor of claim 14, wherein the first unique identification information includes a digital signature associated with the first user entity and the operations further comprise verifying that the first IPv6 packet is from the first user entity based on the digital signature associated with the first user entity, the digital signature generated based on a key shared by the first user entity and an authentication domain configured to perform the verifying.

18. The processor of claim 14, wherein the first unique identification information includes a digital signature associated with the first user entity and the operations further comprise verifying that the first IPv6 packet is from the first user entity based on the digital signature associated with the first user entity, the digital signature generated based on a public/private key pair authentication scheme.

19. The processor of claim 14, wherein the operations further comprise applying a policy to the received first IPv6 packet based on the first unique identification information.

20. The processor of claim 19, wherein the operations further comprise allowing or disallowing receipt of the first IPv6 packet at an intended destination endpoint based on the application of the policy.

21. The processor of claim 19, wherein the operations further comprise applying the policy anywhere in a path within the network layer and between the first user entity and an intended destination endpoint.

22. The processor of claim 19, wherein the operations further comprise applying the policy at a plurality of points included in a path within the network layer and between the first user entity and an intended destination point.

23. The processor of claim 14, wherein the operations further comprise associating a malicious attack with the first user identification information.

24. The processor of claim 14, wherein the operations further comprise identifying the first user entity based on the first user identification information after verifying that the first IPv6 packet is from the first user entity without re-verifying that the first IPv6 packet is from the first user entity.

25. The processor of claim 14, wherein the operations further comprise verifying that the first IPv6 packet is from the first user entity based on the first unique identification information before allowing reception of the first IPv6 packet by an intended destination endpoint.

26. The processor of claim 14, wherein the operations further comprise allowing reception of the first IPv6 packet by an intended destination endpoint based on the first unique identification information.

27. The processor of claim 26, wherein the operations further comprise allowing reception of one or more IPv6 packets subsequent to the first IPv6 packet by the destination endpoint based on the first unique identification information.

28. The method of claim 1, wherein the first unique identification information is included in an options field of the first IPv4 packet header.

* * * * *